United States Patent [19]
Angelle

[11] Patent Number: 5,662,807
[45] Date of Patent: Sep. 2, 1997

[54] APPARATUS AND METHOD FOR HANDLING WASTE

[76] Inventor: Clinton J. Angelle, 1584 Grand Anse Hwy., Breaux Bridge, La. 70517

[21] Appl. No.: 570,910

[22] Filed: Dec. 12, 1995

[51] Int. Cl.$^6$ .................................. B01D 21/18
[52] U.S. Cl. .................. 210/744; 210/803; 210/524; 210/527
[58] Field of Search .................. 210/803, 104, 210/112, 744, 524, 527, 532.1

[56] References Cited

U.S. PATENT DOCUMENTS

| | | | |
|---|---|---|---|
| 1,879,135 | 9/1932 | Downes | 210/527 |
| 2,266,937 | 12/1941 | Tark | 210/524 |
| 3,396,102 | 8/1968 | Forrest | 210/527 |
| 3,410,412 | 11/1968 | Fechter | 210/527 |
| 3,807,560 | 4/1974 | Pentz et al. | 210/803 |
| 3,822,788 | 7/1974 | Denkers et al. | 210/527 |
| 4,776,960 | 10/1988 | Cerroni | 210/528 |
| 5,490,920 | 2/1996 | Fruchtbaum et al. | 210/527 |

FOREIGN PATENT DOCUMENTS

| | | |
|---|---|---|
| 2406858 | 8/1975 | Germany. |
| 537309 | 6/1941 | United Kingdom. |

*Primary Examiner*—Christopher Upton
*Attorney, Agent, or Firm*—C. Dean Domingue

[57] ABSTRACT

An apparatus for handling a waste material is disclosed. Generally, the apparatus comprises a container having disposed thereon a rail member. The apparatus also contains a trolley mounted on the rail. The trolley has operatively associated therewith a handling system that has a wiper that extends into the container. The apparatus may also contain an auger, operatively mounted on the container, adapted for removing the waste from the container. A process for handling a discharged waste slurry is also disclosed.

6 Claims, 5 Drawing Sheets

APPARATUS AND METHOD FOR HANDLING WASTE

BACKGROUND OF THE INVENTION

This invention relates to an apparatus and method for handling waste. More particularly, but not by way of limitation, this invention relates to a system for handling a discharge of waste in a safe and environmentally protected fashion.

The discharge of waste, particularly from the drilling of an oil and gas well for ultimate production, presents many environmental problems. For instance, when a well bore is drilled into the earth, the well may extend for many thousands of feet. During the drilling process, the well bore will be filled with a drilling fluid. The drilling fluid is necessary for several reasons including pressure control, and lubrication of the drill string.

Thus, the drilling fluid is an essential component of the drilling process. The physical and chemical composition of the drilling fluid will vary. However, many times the fluid contains hazardous materials such as oil. Also, the drilling fluid will contain solids which comprise rock and shale cuttings. The volumes thus discharged, coupled with the weight of the cuttings, is very significant.

An important number of environmental regulations pertaining to the removal, handling and treatment of this fluid has been promulgated over the years. The transferring of the drilling fluid from on-site holding tanks (also known as pits) to vehicles capable of hauling the waste creates the significant possibility of spillage. Thus, the handling of the drilling fluid so that the drilling fluid is disposed properly is a major issue for companies. Many types of prior art systems have been attempted to cure this problem, all with limited success. The invention herein disclosed solves these problems by disclosing a system and method of handling environmental waste in a safe and economical process. It should be noted that the invention herein disclosed is also applicable to other industries wherein the handling of waste for transportation to and from sites is necessary.

SUMMARY OF THE INVENTION

An apparatus for handling a waste material is disclosed. Generally, the apparatus comprises a container having disposed thereon a rail member. The apparatus also contains a car mounted on the rail. The car will have extending therefrom a first wiper that extends into the container. The apparatus may also contain an auger means, operatively mounted on the container, for removing the waste from the container.

In one embodiment, the wiper comprises an elongated member having a first end and a second end, with the second end being pivotally mounted to the car. The apparatus may further comprise an oscillating means for oscillating the wiper. Also included will be transporting means for transporting the car via the rail from one end of the container to the other.

Generally, the waste contained within said container consist of a slurry comprising: a fluid; solids suspended in the fluid; and solids. The waste may be a discharged drilling fluid from a well bore. It should be noted, however, that the invention herein disclosed is applicable to other types of waste which contains fluids, solids suspended in fluid, and solids. The apparatus may further comprise pump means, operatively associated with the wiper, for pumping the fluid and solids suspended in the fluid from the container.

In another embodiment, the wiper comprises a first blade member attached to the elongated member at the first end, and a second blade member also attached to the elongated member at the first end. In this embodiment, the first blade member is positioned in a first direction relative to the container and the second blade member is positioned in a second direction relative to the container. Thus, waste can be shifted to one end of the container by the first blade member; alternatively, movement in the opposite direction will shift the waste to the opposite end of the container by the second blade.

A process for handling a discharged waste slurry is also disclosed. In the preferred embodiment, the waste slurry is a drilling fluid discharged from a drilled bore hole. The process includes placing the discharged waste slurry into a container. In this embodiment, the container contains: a rail; a trolley positioned on the rail; a pump means for pumping the discharged waste slurry from the container; a shovel means, operatively associated with the trolley, for shoveling the discharged waste slurry from a first position within said container to a second position within the container.

The process further includes transporting the trolley from a first position to a second position. The pump means can pump the discharged waste slurry from the container. In one embodiment, the shovel means contains an elongated member capable of pivoting. The process further comprises pivoting the shovel means in a swinging fashion, and thereafter, stirring the discharged waste slurry. The pump means can withdraw the waste slurry from the container so that the container is emptied.

The process may further comprise the steps of terminating the pumping, and thereby allowing the waste to separate into a mostly fluid phase and a solid phase. Thereafter, the operator would adjust the physical level of the pump means so that the pump coincides with the level of the fluid phase. Next, the operator would pump the waste from the container.

The process may also include transporting the trolley from a first position to a second position on the rail. Thus, the shovel means would push the solids to the second position within the container. The container may further include an auger positioned at the second position. Therefore, the process further comprises the steps of removing the solids from the container with the aid of the auger.

An advantage of the present system is that the operator may remove tons of environmental waste from a site without spillage to the surrounding area. Another advantage is that the invention combines the concept of a backhoe, pump, dozer, and auger into a complete operable system.

Yet another advantage is that the present invention saves an operator time since in the past it was required to separately utilize the referenced components in order to adequately and safely handle the waste. Still yet another advantage is that the system herein disclosed will produce the operator significant savings.

A feature of the present invention includes use of a mobile trolley mounted on a rail system contained on the container with a motor means. Another feature includes a handling system operatively associated with the trolley. Another feature includes a handling system containing a shovel, pump, and pivoting means mounted thereon.

Yet another feature includes an auger to remove accumulated solids within container. Still yet another feature includes a shovel that may function as wiper, stirrer, or spade. Another feature includes use of a pump that may be varied in position to accommodate the varying levels of waste, as well as the composition of the waste, within the container. Another feature includes operation of the handling system and trolley from a remote location.

DESCRIPTION OF THE PREFERRED EMBODIMENTS

Figure 1:
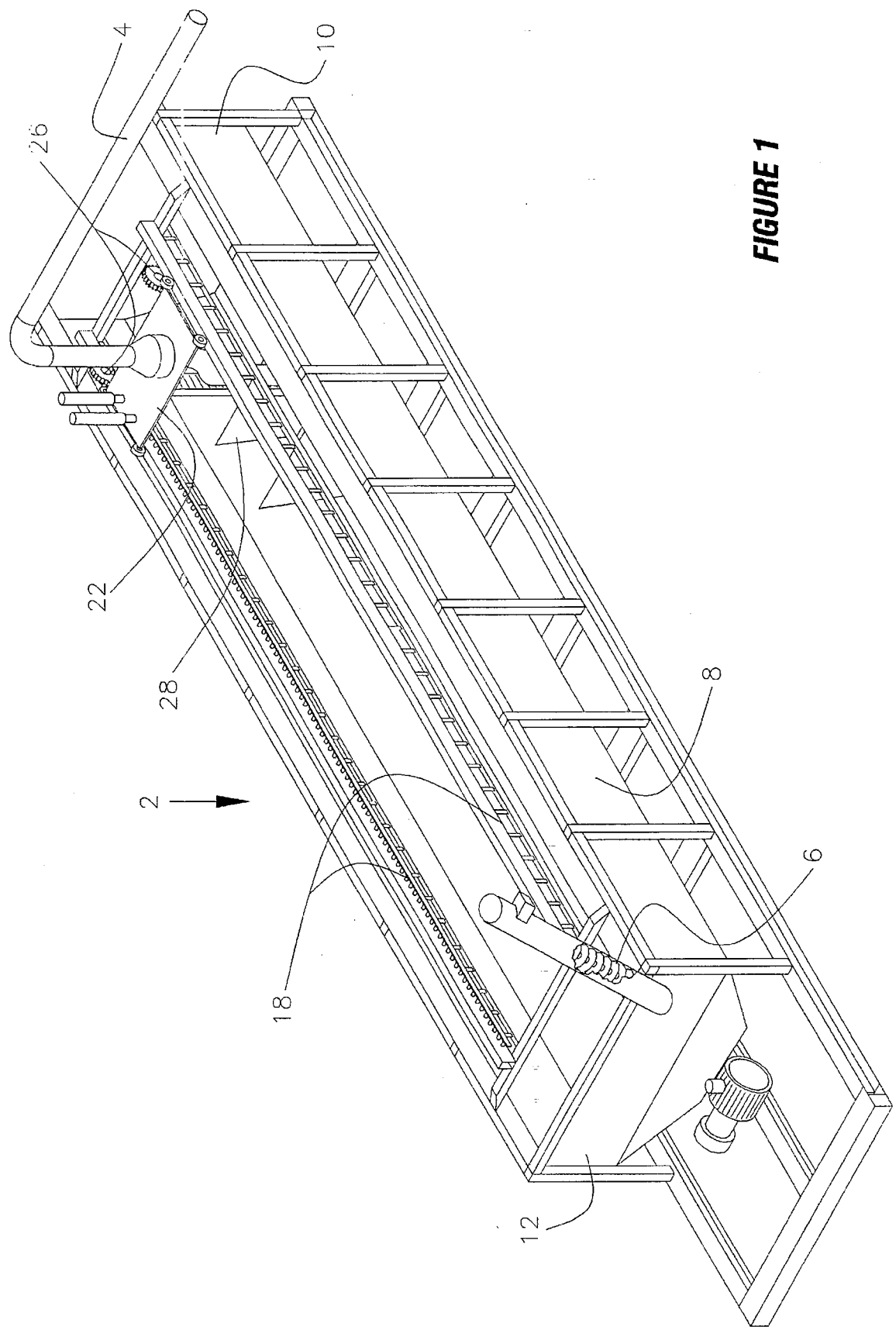
FIG. 1 is an illustration of the apparatus including the container, trolley and handling system, with the handling system being in a first position.

Referring now to FIG. 1, an illustration of the apparatus 2, including the handling system 4 and auger 6, will now be described. Generally, the apparatus 2 includes a container 8 that in the preferred embodiment is an elongated tank member capable of holding the waste. The container 8 contains a first end 10 and a second end 12, with a bottom 14 and an open top end 16. As depicted in FIG. 1, the width of bottom 14 is generally narrower than the open top end 16 so that the movement of the waste within the container 8 may be facilitated, as will be more fully set out later in the application.

The container 8 is designed so that it can be easily transported from located to location. Thus, the container 8, along with the handling system 4 and auger 6 may be used on land locations, or alternatively, may be transported and placed on offshore platform or other remote locations.

The container 8 has contained thereon a pair of rails 18 that are mounted onto the container 8 by means of support braces 20. As shown in FIG. 1, the rails 18 transverse the open top end 16. It should be noted that while a pair of rails 18 has been depicted, a single rail member is within the scope of this invention.

The pair of rails 18 will have operatively associated therewith the handling system 4. The handling system 4 is mounted on a platform 22, with the platform having a set of wheels 24. The platform 22 may also be referred to as the trolley 22. The platform 22 will also contain a pair of sprocket wheels 26 which are propelled by a motor means, which will be described later in the application, so that the handling system is moved back and forth from the first end 10 to the second end 12 as desired by the operator. The sprocket wheel 26 projections fit within and engaged with the tracks 80 for traction.

The handling system 4 will have extending into the container 8 a shovel means 28, operatively associated with the platform 22, for transporting the waste from one end 10 to the other end 12 of the container. Alternatively, the shovel means 18 may be used to stir the waste contained within the container 8. The handling system 4 will also have associated therewith a pump means 30, operatively associated with the shovel means 28, for pumping the waste from the container 8. It should be noted that throughout the application, like numbers in the various figures refer to like components.

Figure 2:
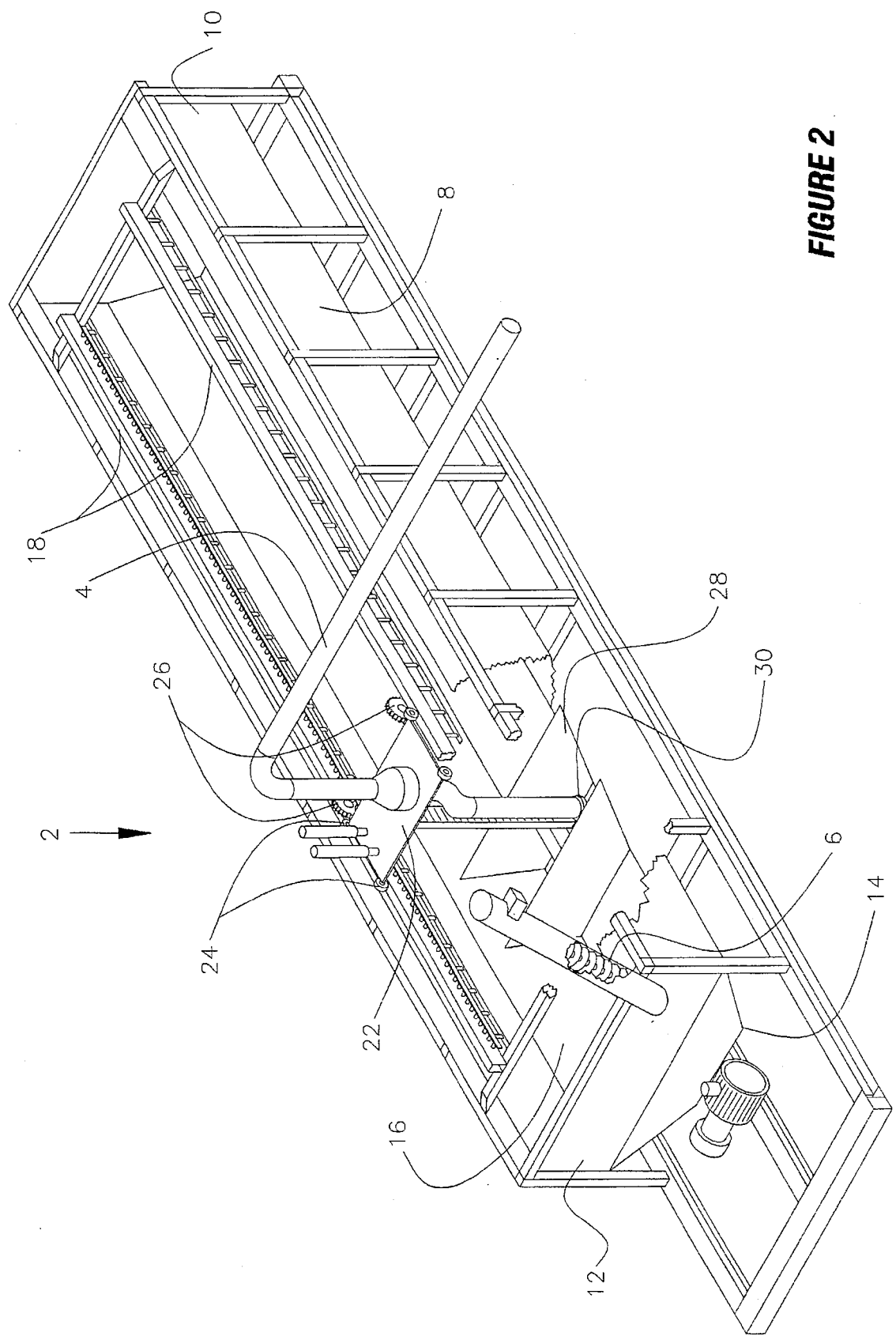
FIG. 2 depicts the apparatus of FIG. 1 with the handling system in a second position.

Referring now to FIG. 2, the apparatus 2 of FIG. 1 is illustrated wherein the trolley 22 and handling system 4 has been moved to a second position. The transporting of the handling system 4 is controlled by activating the motor so that the sprocket wheels 26 revolve so that the trolley 22 (via the wheels 24) is moved. The shovel means 28 will also travel within the container 8. The shovel means 28 is held in a rigid position, perpendicular to the bottom 14. Thus, the waste within the container is pushed to the end 12. At this point, the auger 6 may be activated in order to transport the waste from the container 8.

Figure 3:
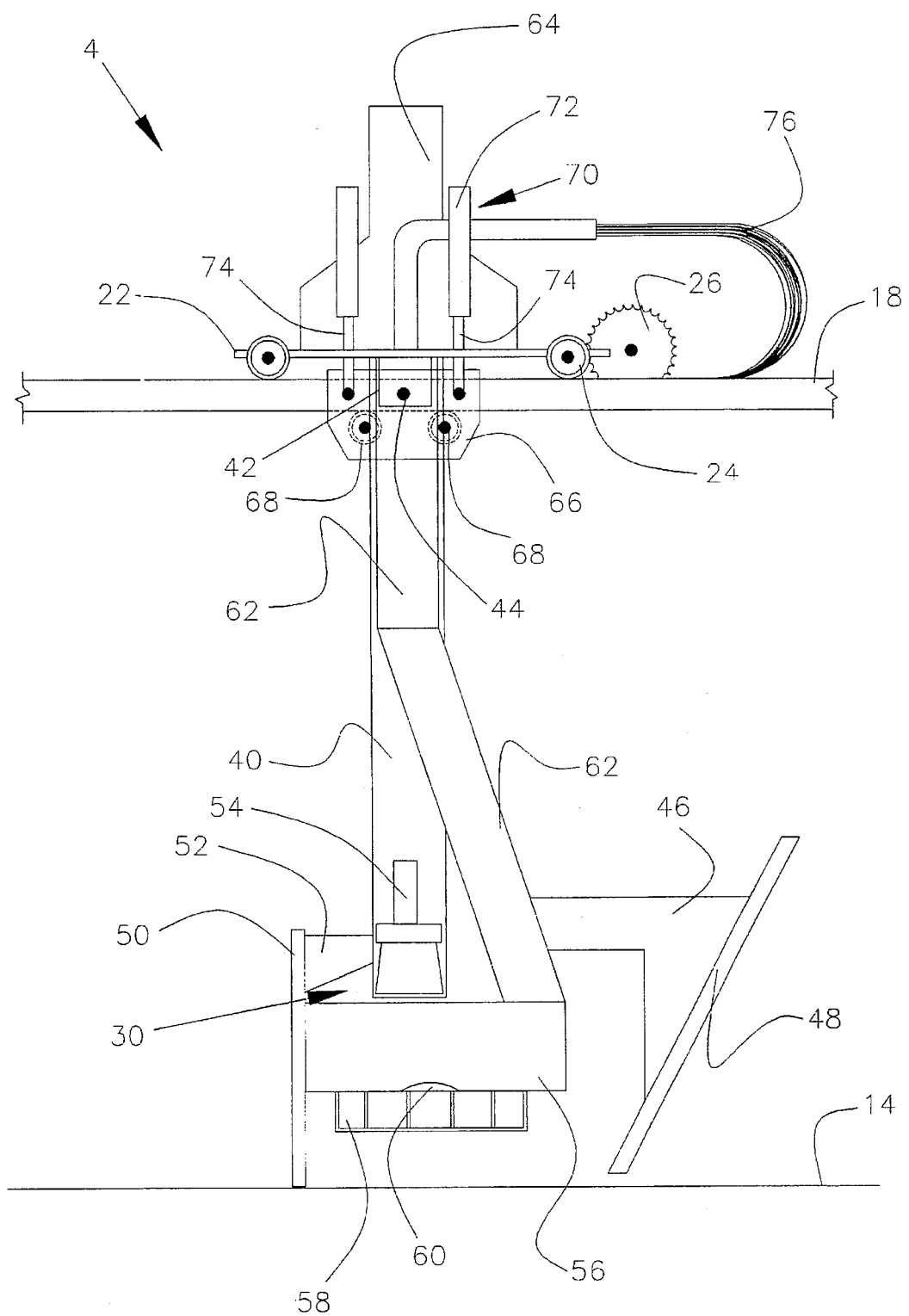
FIG. 3 is a schematic side view illustration of an embodiment of the handling system.

As seen in FIG. 3, an expanded view of the handling system 4 will now be described. As illustrated, the trolley 22 has attached thereto the wheels 24 which are positioned on the track 18. Also associated with the trolley 22 is the sprocket wheels 28 which are driven by a motor means 38? for propelling the sprocket wheels 28.

The shovel means 28 will have associated therewith a boom ladder member 40, with the boom ladder member 40 extending from an extension member 42. The boom member 40 and the extension member 42 are pivotally attached by conventional means such as by pin 44. The extension member 42 is attached to the platform 22.

The boom ladder member 40 will have attached thereto an extension member 46, with the extension member in turn having a shovel blade 48. As depicted in FIG. 3, the shovel blade 48 is tilted at an angle relative to the bottom 14 of container 8. Also depicted in FIG. 3 is a detachable shovel blade 50 which in turn is attached to the boom member 40 via the extension member 52, with the detachable shovel blade 50 facing in an opposite plane with respect to the shovel blade 48. Thus, in operation as the handling system 4 is moved from a first position to a second position and then back to the first position, the shovel blade 50 can act to shovel the waste in a second direction. In an alternative embodiment, the detachable shovel blade 48 need not be connected.

The handling system 4 has included therewith a pump means 30 which includes the pump motor 54 which in turn is adapted to the pump cylinder 56. A guard 58 is also included so that the suction inlet 60 is raised enough off the bottom so that large solids do not enter the pump or block off the suction inlet 60. A disposal conduit 62 leads from the pump cylinder 56 so that the siphoned waste will lead to the swivel joint conduit 64 for ultimate disposal.

Also included will be a plate 66 aiding in the attachment of the boom ladder member to the handling system 4, and associated therewith will be bottom rollers 68 which aids in keeping the platform 22 on the track 18. The handling system 4 will also include the oscillating means 70 for oscillating and pivoting the boom ladder 40. Generally, the oscillating means 70 contains a pair of hydraulic cylinders 72 that have a cooperating pair of hydraulic cylinder rams 74. The oscillating means 70 will be operatively connected to a hydraulic line system 76, with the line system 76 being long enough so that as the handling system travels along the rail 18, the line system 76 will extend the proper distance. Also, back and forth movement of the trolley 22 along the rail 18 is possible.

Figure 4:
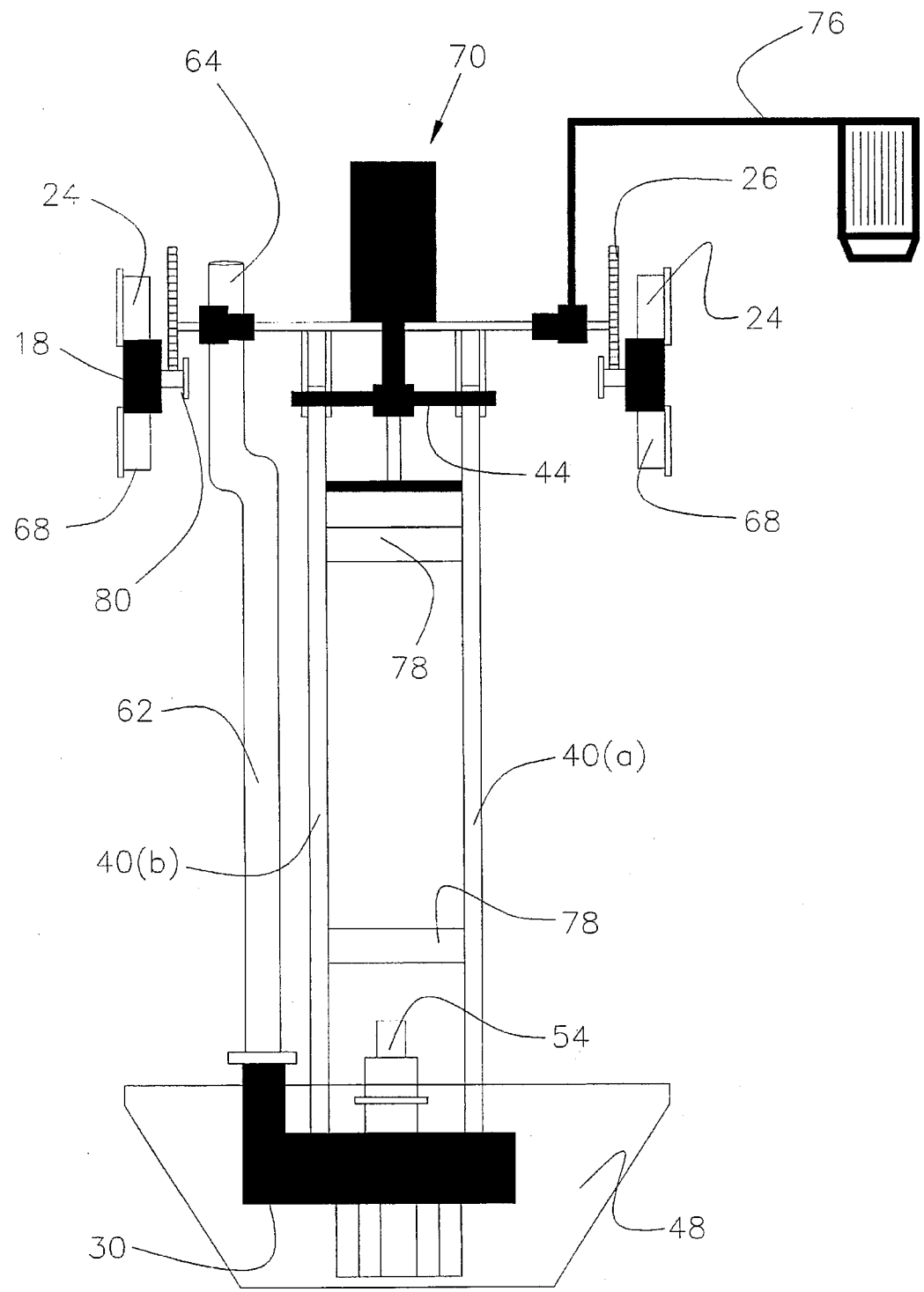
FIG. 4 is a schematic front view illustration of the handling system of FIG. 3.

Referring now to FIG. 4, a front elevation of the handling system 4 is shown. In the preferred embodiment, the boom member 40 has a first leg 40a and a second leg 40b, with the support braces 78 also being included. Also depicted in FIG. 4 is the cooperation of the wheels 24 and the bottom rollers 68 with the rail 18. Additionally, the oscillating means 70 is depicted with the swing cylinders 72 that lead to the hydraulic cylinder rams 74.

FIG. 4 also depicts the means by which the handling system 4 travels along the rail and track 80. More particularly, the sprocket wheels 26 are adapted for engagement with the track 80, with the track 80 being capable of receiving the sprocket projections.

Figure 5:
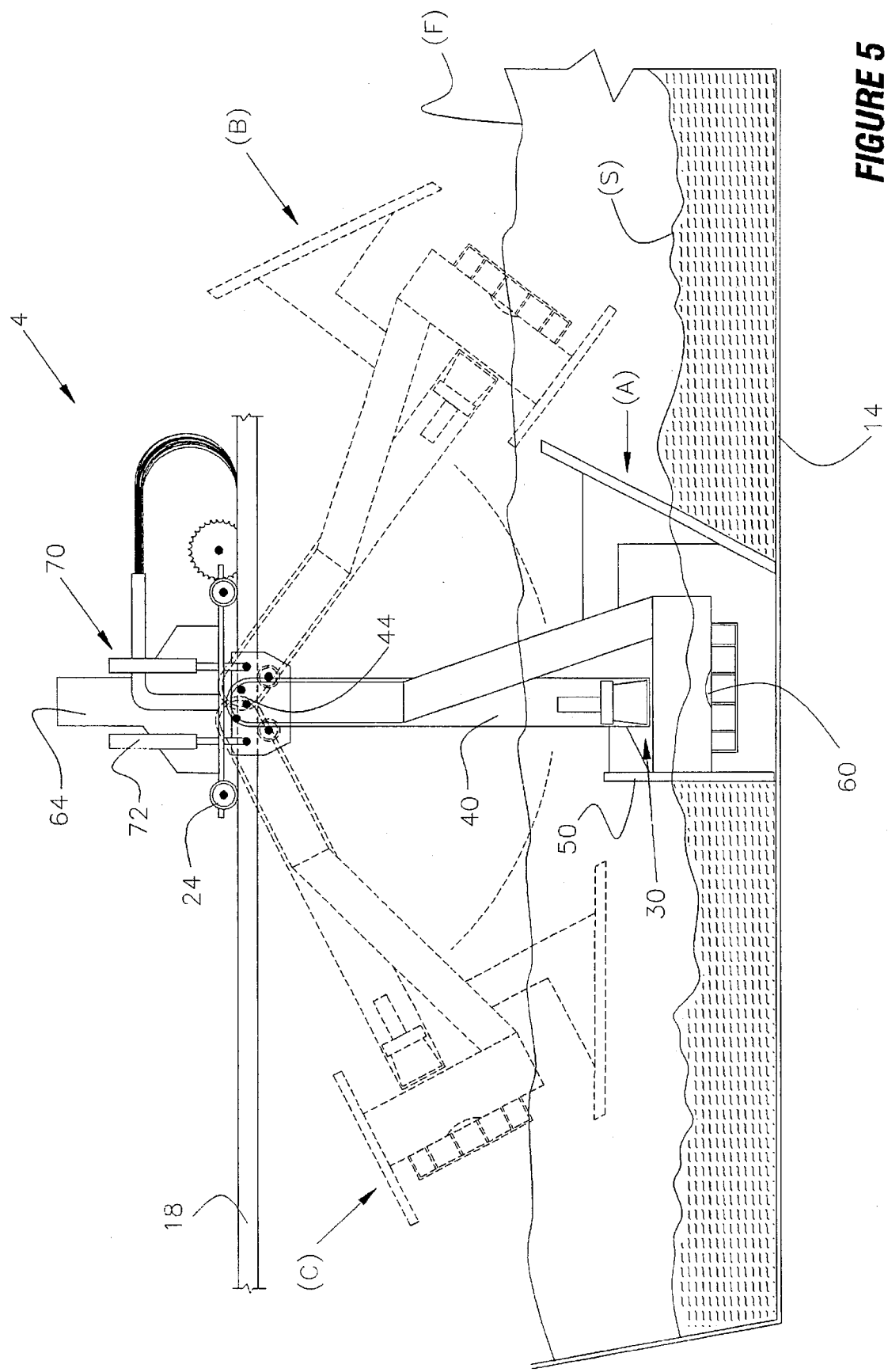
FIG. 5 depicts the schematic side view illustration of the handling system of FIG. 3 in various positions within the container.

Referring now to FIG. 5, the operation of the invention will now be discussed. As shown, the handling system 4 has the boom ladder 40 extended perpendicular relative to the bottom 14 in the position designated by the letter (A). In the illustration of FIG. 5, the container 8 has a waste disposed therein. More particularly, the waste has two different phases, namely: (1) a mostly liquid phase with solids disposed therein; and, (2) a mostly solid phase with a liquid disposed therein.

Thus, with the boom 40 in the position as representative by (A), the operator may activate the motor means so that the sprocket wheels 26 rotate which in turn moves the trolley 22 and handling system 4 forward on the rails 18. As the handling system moves forward, the shovel blade 48 will heap the waste in the direction of the auger 6 for removal by the auger 6. Alternatively, the operator may reverse the direction of the handling system 4 so that the detachable shovel blade 50 will heap the waste in the opposite direction of travel. The operator may also kick on the pump means 30 to suction off accumulated liquid during this process. This can continue at the discretion of the operator until the container 8 is properly emptied.

As an alternate means of operation, the operator may pivot the boom ladder member 40 as shown in the position (B) of FIG. 5. This is accomplished by activating the hydraulic cylinders so that the hydraulic rams pivot the boom ladder member 40. If desired, the position (B) corresponds with a level that places the suction point 60 within the fluid (F) phase.

At the position shown in (B), the pump means 30 may be activated which in turn will suction the fluid (F) phase into the disposal conduit 62. Of course, if so desired by the operator, the sprocket wheel 26 may be activated which in turn would cause the handling system 4 to travel via the rails 18. Thus, the waste would also be stirred by such action. An oscillating movement of the boom 40 may aid in stirring the waste, or alternatively, dislodge unwanted piles of solids that have built up within the container 8.

As yet another alternate means of operation, the operator may pivot the boom ladder member 40 as shown in the position (C) of FIG. 5. This is accomplished by activating the hydraulic cylinders that the hydraulic rams pivot the boom ladder member 40 backward relative to position (B). Again, the position (C) may correspond with a level that places the suction point within the fluid (F) phase.

Therefore, the operator may activate the pump means 30—at the position shown at (C)—which in turn will suction the fluid (F) phase into the disposal conduit 62. The handling system 4 may again be moved via the sprocket wheel 26. An oscillating movement of the boom 40 may aid in stirring the waste, or alternatively, dislodge unwanted piles of solids that have built up within the container 8. The movement of the boom 40, handling system 4 and activation of the pump means 30 is done by the operator depending on the particular characteristics of the waste.

The boom 40, handling system 4, auger 6 and activation of the pump means 30 may be controlled remotely from a site away from the container, or alternatively, the control system for the operator may be placed on the container.

Changes and modifications in the specifically described embodiments can be carried out without departing from the scope of the invention which is intended to be limited only by the scope of the appended claims.

I claim:

1. A system for handling a drilling fluid discharged from an oil and gas well bore comprising:

a tank containing the drilling fluid discharge, said tank having a rail;

a trolley, with said trolley positioned on said rail;

handling means, operatively associated with said trolley, for handling said drilling fluid from a first position within said tank to a second position within said tank and wherein said handling mean comprises an elongated member having a first end and a second end, with the first end of said elongated member being operatively attached to said trolley and wherein said elongated member is pivotally attached to said trolley;

a first wiper blade attached to the second end of said elongated member;

a pump means, operatively associated with said handling means, for pumping the discharged drilling fluid from said tank;

conduit means, operatively associated with said pump means, for providing a passageway for the discharged drilling fluid to be pumped from said tank;

motor means for pivoting said elongated member; and, an auger, positioned within said tank.

2. The system of claim 1 wherein said elongated member further comprises:

a second wiper blade attached to the second end of said elongated member, and facing in an opposite lateral plane from said first wiper blade.

3. A process for handling a discharged drilling fluid from a drilled bore hole, the process comprising:

placing the discharged drilling fluid into a container, the container containing: a rail; a trolley, positioned on said rail; a pump means for pumping the discharged drilling fluid from said container; a handling means, operatively associated with said trolley, for handling said discharged drilling fluid from a first position within said tank to a second position within said tank, and wherein the handling means contains an elongated member capable of pivoting; and, an auger positioned at the second position;

transporting said trolley from a first position to a second position;

pumping the discharged drilling fluid from said container pivoting said handling means;

stirring the discharged drilling fluid;

pumping the discharged drilling fluid from said container;

terminating the pumping;

allowing the waste to separate into a fluid phase and a solid phase;

adjusting the pump means with the level of the fluid phase;

pumping the waste from said container;

transporting said trolley from a first position to a second position;

pushing the solids to the second position;

removing the solids from said container with the aid of said auger.

4. An apparatus for handling a waste material comprising:

a container having disposed thereon a rail member;

a car mounted on said rail, said car having extending therefrom a first wiper, said wiper extending into said container and wherein said first wiper comprises an elongated member having a first end and a second end, with the second end being pivotally mounted to said car;

auger means, operatively mounted on said container, for removing the waste from said container motor means for swinging said wiper;

transporting means for transporting said car;

and wherein said waste contains a slurry of fluid, solids suspended in the fluid, and solids, and the apparatus further comprises pump means, operatively associated with said wiper, for pumping said fluid and solids suspended in the fluid from said container.

5. The apparatus of claim 4 wherein said wiper comprises a first blade member attached to said elongated member at the first end.

6. The apparatus of claim 5 wherein said wiper further comprises a second blade member attached to said elongated member at the first end, and wherein said first blade member is positioned in a first direction relative to the container and said second blade member is positioned in a second direction relative to the container.

* * * * *